United States Patent [19]

Zaun et al.

[11] Patent Number: 5,241,780
[45] Date of Patent: Sep. 7, 1993

[54] WHEEL SHIELD AND LADDER FOR A SPRAY VEHICLE

[75] Inventors: Richard D. Zaun, Des Moines; Michael L Pearson, Ankeny, both of Iowa

[73] Assignee: Deere & Company, Moline, Ill.

[21] Appl. No.: 778,035

[22] Filed: Oct. 17, 1991

[51] Int. Cl.⁵ .................................................. A01C 15/04
[52] U.S. Cl. ...................................... 47/1.7; 280/164.1; 293/58
[58] Field of Search ................. 47/1.7; 293/15, 42, 293/58; 280/156, 157, 164.1

[56] References Cited

U.S. PATENT DOCUMENTS

| | | | |
|---|---|---|---|
| 1,002,114 | 8/1911 | Barnes | 293/58 |
| 1,099,058 | 6/1914 | Kruckow | 293/58 |
| 2,822,216 | 2/1958 | Finley et al. | 47/1.7 |
| 3,588,136 | 6/1971 | Schlueter | 280/164.1 |
| 4,583,319 | 4/1986 | Wolff et al. | 47/1.7 |

FOREIGN PATENT DOCUMENTS 2531890 2/1977 Fed. Rep. of Germany ... 280/164.1
2855401 7/1980 Fed. Rep. of Germany ... 280/164.1

OTHER PUBLICATIONS

"Convenient Crop Care" brochure, pp. 1-7.
Melroe "Spra-Coupe" brochure.

*Primary Examiner*—Ramon S. Britts
*Assistant Examiner*—Joanne C. Downs

[57] ABSTRACT

A combination wheel shield and ladder for an agricultural vehicle such as a sprayer includes a deformable plastic body with a profile designed to control the path of deflection and to return the body to original shape after deflection. The shield is mounted on a steel framework also designed to help control deflection and assure return to the original shape. A bail limits maximum shield deflection and increases the strength of the framework. A ladder is incorporated into a plastic wheel shield extension A combination handle-step structure located above the wheel and special platform structure located on the drop axle provide convenient access to the operator's station for all adjusted positions of the drop axle.

20 Claims, 2 Drawing Sheets

WHEEL SHIELD AND LADDER FOR A SPRAY VEHICLE

BACKGROUND OF THE INVENTION

Field of the Invention

The present invention relates generally to agricultural sprayers and more specifically to wheel shields for a self-propelled sprayer.

Related Art

Sprayers such as the John Deere Model 6000 Hi-Cycle Sprayer include a main frame supported by a steerable wheel and a pair of drive wheels on transversely adjustable drop axles for movement between rows of crops. Metal shields are supported forwardly of the wheels to divide plants and prevent the wheels from smashing the crop during spraying. In order to maximize protection, the shields are mounted close to the ground. Since the operator cannot see the surface of the ground because of a dense and canopied crop, irregularities such as holes and washouts can cause the shield to crumple and bend out of shape. The metal shields are relatively difficult to manufacture and are subject to corrosion by harsh chemicals. Also, the shields have to be painted, and the paint wears off quickly as plants repeatedly pass by resulting in rust and appearance problems.

The elevated location of the operator's station on a self-propelled sprayer requires a ladder for access. The ladder typically has to be movable laterally to prevent crop damage. Conveniently locating a simple and easily usable ladder assembly on the sprayer has been a continuing source of difficulty.

BRIEF SUMMARY OF THE INVENTION

It is therefore an object of the present invention to provide an improved shield for a sprayer which overcomes the aforementioned problems.

It is another object of the present invention to provide an improved shield for a sprayer which is easier to manufacture and eliminates the problems associated with metal shields. It is a further object to provide such a shield with better impact absorption, shape retention, wear life and appearance than most previously available shields.

It is a further object to provide an improved ladder assembly for a sprayer. It is another object to provide a relatively simple and easy to use ladder assembly which is combined with a wheel shield to provide uncongested access to the operator's station on a sprayer. It is still a further object to provide such a ladder assembly which does not have to be repositioned after adjustment of sprayer wheel tread and which provides minimal disturbance to the crop.

A wheel shield constructed in accordance with the teachings of the present invention includes a plastic body with a profile designed to control the path of deflection and to return the body to original shape after deflection. The shield is mounted on a steel framework also designed to help control deflection and assure return to the original shape. The wheel shield provides a smooth flowing deflection surface and greatly improves the appearance of the sprayer. The plastic shield requires no painting and is non-corrosive and long-lasting. A bail limits maximum shield deflection and increases the strength of the metal framework.

A ladder is incorporated into a plastic wheel shield extension and into metal framework which supports the wheel shield on the drop axle so that a separate ladder assembly is eliminated. The shield and ladder as well as a platform move with the drop axle during transverse movement of the axle so that further adjustment of the shield, ladder or platform is unnecessary after the wheels are set for the given row spacing. Additional platform structure is incorporated into the ladder above the wheel and includes handles located below railing structure on the vehicle frame to provide easy access to the operator's station, for all adjusted positions of the drop axle, in a relatively simple and inexpensive manner. The ladder is compact and minimizes interruption of the smooth flowing surface on the forward portion of the shield to lessen damage to the crop.

These and other objects, features and advantages of the present invention will become apparent to one skilled in the art upon reading the following detailed description in view of the drawings.

DETAILED DESCRIPTION OF THE DRAWINGS

Figure 1:
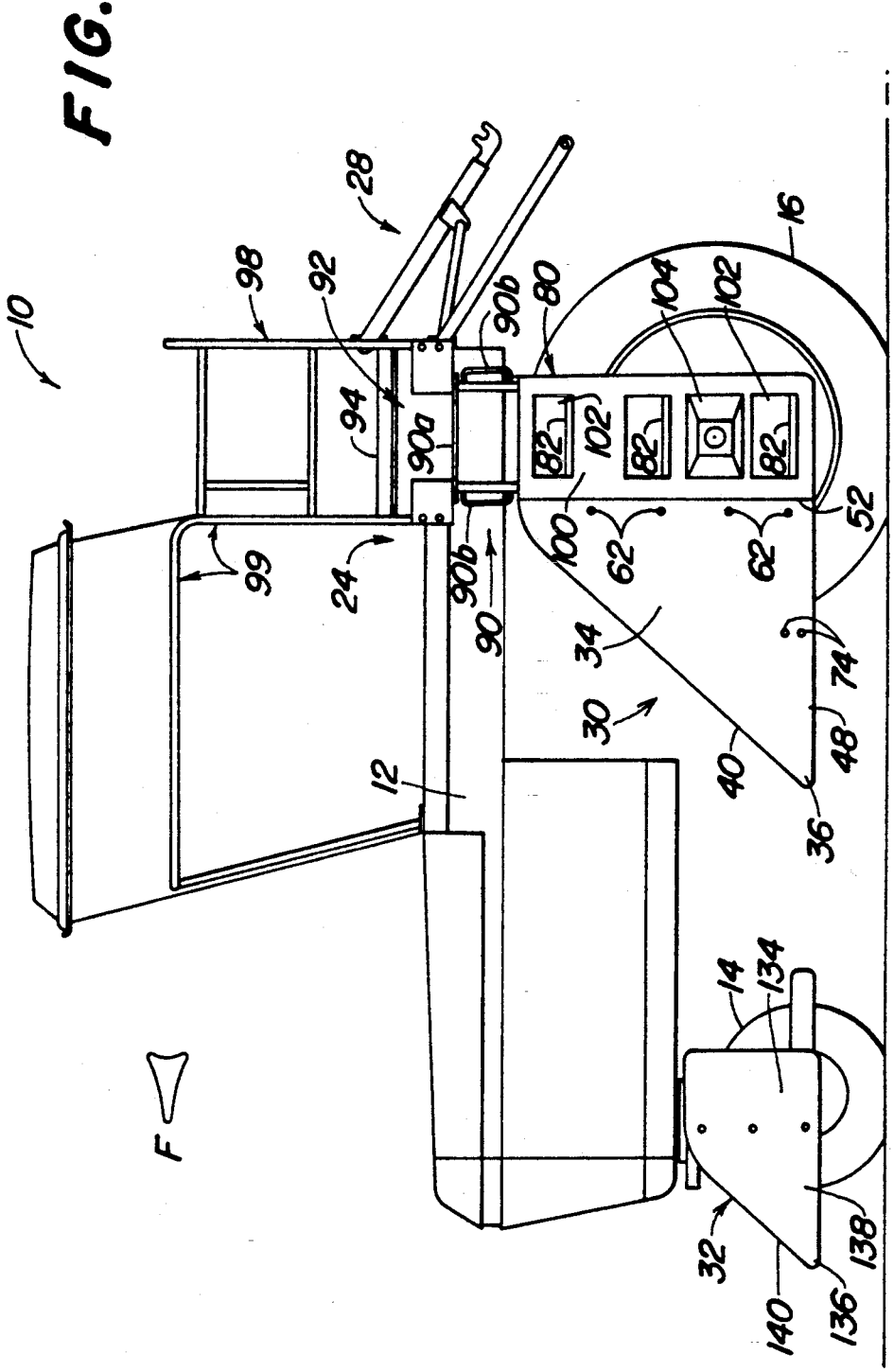
FIG. 1 is a side view of a sprayer with the shield and ladder structure of the present invention attached thereto.
Figure 2:
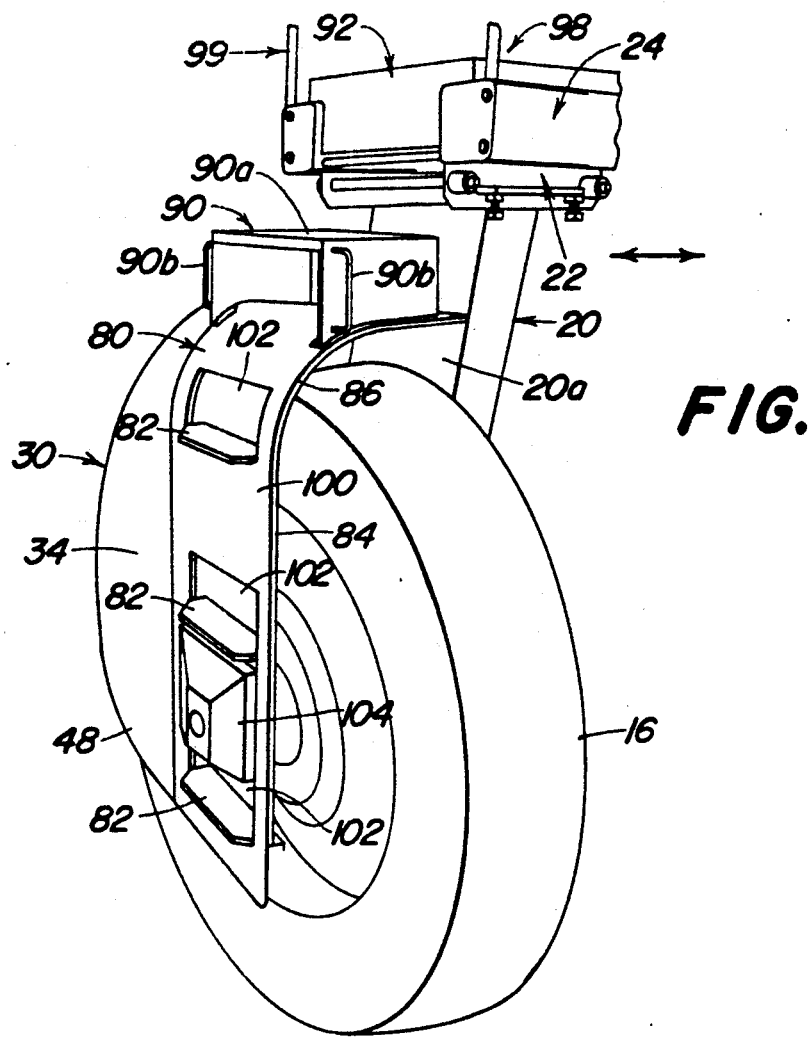
FIG. 2 is a rear perspective view of the left drop axle assembly of FIG. 1 with the shield and ladder structure.

Referring now to FIG. 1, therein is shown a self-propelled sprayer or chemical applicator 10 having a main frame 12 supported for forward movement over a field with parallel rows of plants by a forward steerable wheel 14 and a pair of transversely spaced rear drive wheels 16. The drive wheels are carried at the lower ends of a pair of transversely spaced drop axle assemblies 20 (FIG. 2) having upper ends 22 firmly supported by rail or tube structure 24 extending transversely in both directions from the rear, central portion of the main frame 12. The drop assemblies 20 extend a substantial distance vertically from the wheels 16 to the tube structure 24 to provide good under-axle crop clearance for working in mature crops. A boom support 28 extends rearwardly from the main frame for carrying a conventional transversely extending boom (not shown) with spray nozzles for dispensing chemicals to the soil and/or crop surfaces.

The forward wheel 14 runs between two adjacent rows of plants, and the rear drive wheels 16 also run between rows of plants. The drop assemblies 20 are transversely adjustable on the tube structure 24 to adjust rear wheel tread to accommodate different row spacings or patterns that may be encountered from field to field. The wheels 16 are driven by hydraulic motors (not shown) located at the lower ends of the drop assemblies 20.

Figure 3:
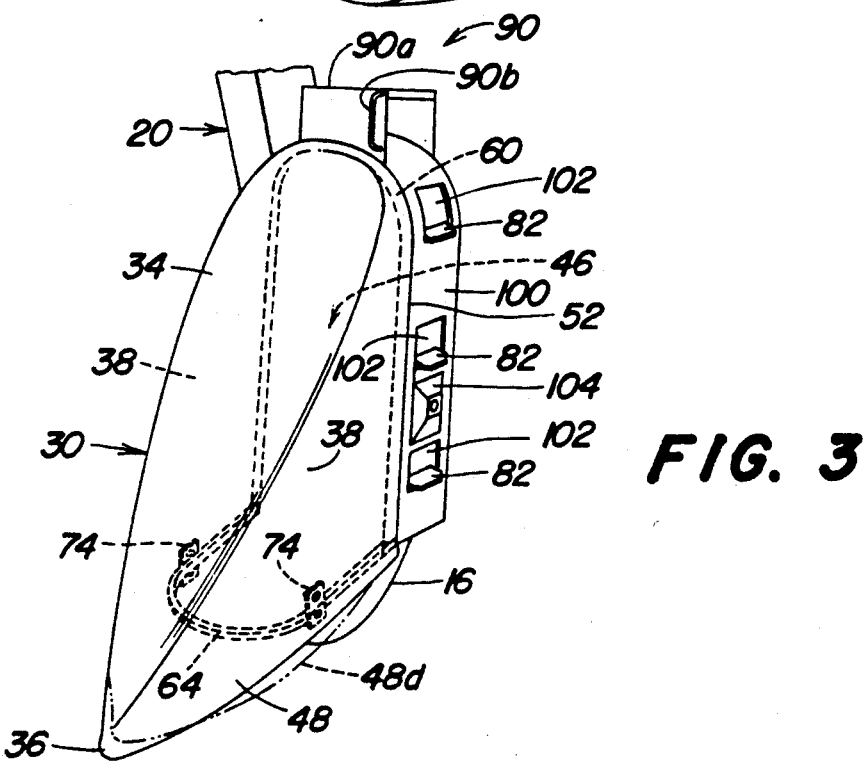
FIG. 3 is a front view of the axle assembly of FIG. 2, with the path of deflection of the shield shown in broken lines.

A shield 30 supported adjacent each of the wheels 16 and a shield 32 supported adjacent the steerable wheel 14 prevent the wheels from smashing the crop during spraying. The shield 30 includes a deformable plastic body 34 having a lower, forward nose portion 36 and opposed sidewalls 38 extending outwardly in the rearward direction from the nose portion 36. A forward wall 40 extends upwardly and rearwardly from the nose portion 36 and connects the sidewalls 38 to form a rearwardly and downwardly opening tire accommodation space indicated generally at 46 in FIG. 3. The sidewalls 38 each include a lower portion 48 which is concave toward the tire accommodation space 46 so that if an obstacle is contacted by the nose 36, the body 34 can deflect (see 48d of FIG. 3) outwardly as the nose moves rearwardly. Once the obstacle is cleared, the body 34 springs back to its original shape.

The shield body 34 terminates in an aft end 52 lying in an upright plane. The body 34 is supported from the drop assembly 20 by an inverted U-shaped angle iron frame 60 (FIG. 3) extending over the wheel 16. The aft end 52 of the shield 30 is fixed to the frame 60 by bolts 62. A bail 64 is fixed to and extends forwardly from the lower end of the frame 60 around the lower forward portion of the wheel 16. Each of the lower portions 48 of the body 34 is attached near the front of the bail 64 (slightly rearwardly of the fore-and-aft center of the lower portion 48) by brackets 74. The bail 64 affords added strength to the frame 60 and support to the shield 30, and helps control deflection of the shield 30 when an obstacle is encountered to ensure that the shield will not contact the wheel 16 and will return to its original shape after the obstacle is passed.

The metal frame 60 which supports the rear shield 30 is bolted or otherwise releasibly secured to a ladder frame indicated generally at 80 having a plurality of rungs 82 extending in the fore-and aft direction between spaced upright frame or tube members 84 (FIG. 2) which curve inwardly at location 86 to a connection with the outer wall 20a of the drop assembly 20. The rungs 82 have tapered leading edges and project only a short distance out from the wheel 16 to minimize crop disturbance The shield 30 and frame 60 may be easily removed from the ladder frame 80 if crop conditions so dictate.

A combination handle-auxiliary step structure 90 is supported above the ladder frame 80 and extends inwardly to the outer wall 20a. A platform structure 92 is connected to the upper end 22 of the drop axle 20 for movement therewith between the ends of the tubes of the structure 24. When the drop assembly 20 is adjusted outwardly on the tube structure 24, the upper surface 90a acts as an intermediate step between the rung 82 adjacent the top of the wheel 16 and the platform structure 92 (FIG. 1) located above the tube structure 24 and attached to the upper end 22 of the drop axle. The platform structure 92 provides a stepping location between the cantilevered tubes of the structure 24. When the drop assembly 20 is adjusted inwardly, the structure 90 moves under the tube structure 24 and the structure 92 telescopes under a platform 94 which may be used when the drop axle 20 is adjusted to the inwardmost position. The platform 94 is used primarily during servicing of the sprayer 10.

For better accessibility, handles 90b are provided at the front and rear of the structure 90. Railing structures 98 and 99 are connected to the ends of the tubes of the structure 24 above the handles 90b and define an upper access area adjacent the operator's station on the vehicle.

A plastic shield extension 100 is bolted to the ladder frame 80 and forms with the body 34 a generally smooth, continuous deflecting surface extending rearwardly past the ladder rungs 82. Apertures 102 are formed in the shield extension 100 above the rungs 82. A wheel hub shield portion 104 projects outwardly from the shield extension 100 between the lowermost and second rungs 82.

The forward shield 32 includes a deformable plastic body 134 with a nose portion 136 and opposite sidewalls 138 connected by a rearwardly and upwardly directed forward wall 140. The lower portions of the sidewalls 138 are concave toward the wheel 14 to deflect in the manner set forth above for the shield 30. A frame and bail arrangement is also utilized to provide support for the shield 32 and to assure its return to original shape after deflection.

Having described the preferred embodiment, it will become apparent that various modifications can be made without departing from the scope of the invention as defined in the accompanying claims.

We claim:

1. In an agricultural vehicle such as a chemical applicator having a frame supported for forward movement over the ground by a plurality of wheels, the wheels adapted for positioning between rows of crop, shield structure for protecting the crop from one of the wheels, comprising:

a flexible body having a lower, forward nose portion, sidewalls extending outwardly in the rearward direction from the nose portion, a forward wall extending upwardly and rearwardly from the nose portion and connected to the sidewalls to form a tire accommodation space, wherein the sidewalls include a lower portion which is concave toward the tire accommodation space;

means supporting the body from the applicator with said one of the wheels positioned between the sidewalls in the accommodation space for facilitating deflection of the lower portion of the sidewalls outwardly from the wheel when the nose portion encounters an obstacle while the applicator is moving in the forward direction, the means supporting the body including a support frame extending downwardly adjacent the wheel and connected to the aft and of the body; and a bail extending forwardly from the support frame and around the wheel, and means for connecting the bail to the support frame for increasing the strength of the support frame and limiting the amount the nose can flex rearwardly toward the wheel.

2. The invention as set forth in claim 1 wherein the body terminates in an aft end lying in an upright plane, and the support frame comprises an inverted U-shaped member which extends over the wheel and is connected to the aft end of the body.

3. The invention as set forth in claim 2 including means for connecting the bail to the lowermost portion of the inverted U-shaped member.

4. The invention as set forth in claim 2 including ladder structure having a plurality of rungs and wherein the support frame is releasibly connected to the ladder structure.

5. The invention as set forth in claim 1 including an extension located rearwardly of the body and forming a generally continuous crop deflecting surface with a one of the sidewalls, and a ladder supported adjacent the wheel, wherein the extension includes apertures defining a portion of the ladder.

6. The invention as set forth in claim 5 wherein the means supporting the body includes a ladder frame defining a second portion of the ladder.

7. The invention as set forth in claim 6 including means for adjusting the wheel transversely, wherein the support frame is supported for transverse movement with the wheel.

8. The invention as set forth in claim 7 wherein the ladder includes a horizontal platform, and means connecting the horizontal platform to the support frame so that the platform extends inwardly over the wheel for providing a step when the wheel is adjusted transversely outwardly.

9. In an agricultural vehicle such as a chemical applicator having a frame supported for forward movement over the ground by a plurality of wheels, the wheels adapted for positioning between rows of crop, shield structure for protecting the crop from one of the wheels, comprising:

a flexible body having a lower, forward nose portion, sidewalls extending outwardly in the rearward direction from the nose portion, a forward wall extending upwardly and rearwardly from the nose portion and connected to the sidewalls to form a rearwardly opening tire accommodation space;

means supporting the body from the applicator with said one of the wheels positioned between the sidewalls in the accommodation space for facilitating deflection of the lower portion of the sidewalls outwardly from the wheel when the nose portion encounters an obstacle while the applicator is moving in the forward direction;

an extension located rearwardly of the body and forming a generally continuous crop deflecting surface with a one of the sidewalls, and a ladder supported adjacent the wheel, wherein the extension includes apertures defining a portion of the ladder;

wherein the means supporting the body includes a ladder frame defining a second portion of the ladder;

means for adjusting the wheel transversely, wherein the support frame is movable transversely with the wheel;

wherein the ladder includes a horizontal platform, and means connecting the horizontal platform to the support frame so that the platform extends inwardly over the wheel for providing a step when the wheel is adjusted transversely outwardly; and further including railing structure connected to the applicator frame above the platform.

10. The invention as set forth in claim 9 further including a handle projecting in the fore-and-aft direction from the platform below the railing structure.

11. In a chemical applicator having a frame supported for forward movement over the ground by a plurality of wheels including rear drive wheels supported from transversely adjustable drop axle assemblies, the wheels adapted for positioning between rows of crop, shield structure for protecting the crop from one of the wheels, comprising:

a ladder frame fixed to one of the drop axle assemblies for movement transversely with said drop axle;

a body having a lower, forward nose portion, curved deformable sidewalls extending rearwardly from the nose portion, and a forward wall extending upwardly and rearwardly from the nose portion and connected to the sidewalls to form a tire accommodation space;

means releasibly connecting the body to the ladder frame for supporting the body from said one of the drop axle assemblies with said one of the wheels positioned between the sidewalls in the accommodation space and facilitating deflection of the sidewalls outwardly from the wheel when the nose portion encounters an obstacle while the applicator is moving in the forward direction; and wherein the ladder frame extends downwardly on the outside of said one of the wheels for providing access to an access portion of the applicator above the drop axle assembly.

12. The invention as set forth in claim 11 wherein the ladder frame comprises a rearward extension of the body, and wherein the means releasibly connecting the body to the ladder frame includes an upright frame extending over the tire accommodation space and connected to the body.

13. The invention as set forth in claim 11 including a horizontal platform supported above said one of the wheels and defining an intermediate step between the access portion and the rearward extension.

14. The invention as set forth in claim 13 wherein the platform is movable with the drop axle assembly to an outward position outwardly of the access portion and to an inward position below the access portion.

15. In a chemical applicator having a frame supported for forward movement over the ground by a plurality of wheels including rear drive wheels supported from transversely adjustable drop axle assemblies, the wheels adapted for positioning between rows of crop, shield structure for protecting the crop from one of the wheels, comprising:

a deformable body having a lower, forward nose portion, curved sidewalls extending outwardly in the rearward direction from the nose portion, and a forward wall extending upwardly and rearwardly from the nose portion and connected to the sidewalls to form a rearwardly opening tire accommodation space;

means supporting the body from said one of the drop axle assemblies with said one of the wheels positioned between the sidewalls in the accommodation space for facilitating deflection of the sidewalls outwardly from the wheel when the nose portion encounters an obstacle while the applicator is moving in the forward direction;

wherein the shield includes a rear ladder-defining portion extending downwardly on the outside of said one of the wheels for providing access to an access portion of the applicator above the drop axle assembly;

a horizontal platform supported above said one of the wheels and defining an intermediate step between the access portion and the rearward extension; and wherein the access portion includes a railing extending upwardly from a location adjacent the platform.

16. The invention as set forth in claim 15 including a handle connected to the platform below the railing.

17. In a chemical applicator having a frame supported for forward movement over the ground by a plurality of wheels including rear drive wheels supported from transversely adjustable drop axle assemblies, the wheels adapted for positioning between rows of crop, shield structure for protecting the crop from one of the wheels, comprising:

a deformable body having a lower, forward nose portion, curved sidewalls extending outwardly in the rearward direction from the nose portion, and a forward wall extending upwardly and rearwardly from the nose portion and connected to the sidewalls to form a rearwardly opening tire accommodation space;

means supporting the body from said one of the drop axle assemblies with said one of the wheels positioned between the sidewalls in the accommodation space for facilitating deflection of the sidewalls away from the wheel when the nose portion encounters an obstacle while the applicator is moving in the forward direction;

wherein the shield structure includes a rear ladder-defining portion extending downwardly on the outside of said one of the wheels for providing access to an access portion of the applicator above the drop axle assembly; and wherein the applicator frame includes a pair of fore-and-aft spaced tubes supporting said one of the drop axle assemblies, and platform structure supported between the tubes for movement with one of the drop axle assemblies.

18. The invention as set forth in claim 17 including an upper platform fixed to the applicator frame above the platform structure, wherein the platform structure telescopes under the upper platform as said one of the drop assemblies is adjusted inwardly.

19. Crop shield structure for an agricultural vehicle such as a chemical applicator having a frame supported for forward movement over the ground by a plurality of wheels, the wheels adapted for positioning between rows of crop, the shield structure for protecting the crop from one of the wheels and comprising:

a body defining a tire accommodation space and having a generally upright, inverted U-shaped rear section with laterally offset sides, the body having a lower, forward nose portion and flexible sidewalls extending outwardly in the rearward direction from the nose portion to the offset sides of the U-shaped rear section;

a bail having sidelegs;

means connecting the bail and the body such that the sidelegs extend generally horizontally from the lower offset sides of the U-shaped rear section and the bail terminates rearwardly of the nose portion for permitting lateral deflection of the sidewalls while limiting rearward deflection of the nose portion when an obstacle is encountered by the nose portion.

20. The invention as set forth in claim 19 including an inverted U-shaped support frame extending over the tire accommodation space and having transversely offset lower sidelegs connected to the bail sidelegs for increasing the strength of the shield structure.

* * * * *